Patented Dec. 31, 1935

2,025,984

UNITED STATES PATENT OFFICE 2,025,984

ESTER OF HYDROXY CARBOXYLIC ACIDS

Benjamin R. Harris, Chicago, Ill.

No Drawing. Application January 8, 1934,
Serial No. 705,824

20 Claims. (Cl. 260—106)

My invention relates to new chemical compounds and uses thereof.

In many of the arts there is a need for materials having the properties of wetting, foaming, frothing, emulsifying, detergent and penetrating agents. These properties are named in consideration of the functions involved and fail to indicate the real nature and property of the substances. The useful functions of such substances are the result for the most part of interface modification and for convenience such materials are properly termed collectively as interface modifiers.

The principal object of my invention is the provision of an improved interface modifier.

Another object is to provide an interface modifier with somewhat different characteristics than interface modifiers heretofore known.

A further object is the provision of an improved treating bath for use in various industries.

The new chemical compounds of my invention are in general esters of fatty acids with hydroxy carboxylic acids wherein there is at least one unesterified hydroxy group in the carboxylic acid residue. In general, the fatty acid radical contains at least five carbon atoms, but preferably at least eight. For certain purposes, particularly where a substantially solid or plastic compound is desired, the fatty acid radical may contain twelve carbons or more. Various members of the class above set out and preferred methods of making the same will be clear from the following description.

First as to a general method of preparation: I dissolve or suspend the hydroxy carboxylic acid, freed from moisture, in dry pyridine or some other suitable agent, employing heat if necessary. This mixture or solution is then cooled and the required amount of acyl halide of the fatty acid, such as acyl chloride, is introduced with agitation. The acyl chloride may be introduced as such or by first dissolving it in an inert solvent such as chloroform or carbon tetrachloride. Care should be taken throughout to exclude moisture as far as possible and to cool so as to control the heat of reaction. The mixture is allowed to stand at room temperature or is agitated at room temperature for several hours, sometimes six or eight hours or even longer. The mixture is then treated by pouring it with agitation into iced dilute sulfuric acid or some other acidulating agent. This mixture is allowed to stand and the ester will separate out. When the acyl chloride of solid fatty acids are used, such as those having twelve carbons or more, the product separates out in the form of a flocculent solid. In the case of acyl chlorides of fatty acids with less than twelve carbons, the product is usually of a liquid or semi-liquid character.

When the ester has separated either in solid or liquid form, it is preferably washed several times with hot water or with brine or with some other suitable electrolyte solution. The washing is carried on at room temperature, or with the application of heat, as seems most suitable for the product and under the conditions employed. The final product may be left in a hydrated condition or it may be dried.

As a further example of the invention, consider mucic acid palmitate. In the preparation of this material, I dissolve four parts of mucic acid in 55 parts of pyridine and add to the mixture 6 parts of palmityl chloride gradually, with stirring. This mixed product is allowed to stand for about eight hours with occasional stirring. The entire mass is then poured into a solution of about 5% sulfuric acid in cold water, and about 1% of salt finally added. The mucic acid palmitate separates out. The ester is then washed several times with hot water to remove the pyridine sulphate, about 3% of salt being added to the wash water each time. When the pyridine has been substantially removed, the compound is dried. If it is desired to produce the salt of the ester, I may neutralize the compound obtained above with a small amount of an alkaline agent. If, for example, the sodium salt is desired, I employ a small amount of sodium carbonate or sodium hydroxide. In the same manner, I can prepare the fatty acid derivatives of other hydroxy carboxylic acids.

As a further example, I prepare the stearic acid ester of tartaric acid as follows:

4 parts of tartaric acid are dissolved in 60 parts of dry pyridine and 8 parts of stearyl chloride added with stirring. The mixture is allowed to stand over night and the mass is then poured into a 5% iced sulfuric acid solution. The stearic acid ester of tartaric acid separates out, is washed several times to remove pyridine sulfate, using salt if necessary, and the final product dried. It is neutralized, if desired, by sodium or potassium carbonate or ammonium hydroxide to form the alkaline salt of stearic acid ester of tartaric acid.

As a further example, I prepare the stearic acid esters of gluconic acid as follows:

6 parts of gluconic acid are suspended in 80 parts of dry pyridine, and 9½ parts of stearyl chloride added slowly with stirring. The product is allowed to stand about twelve hours and is then acidulated with iced dilute sulfuric acid. Gluconic acid stearate is removed, washed as in the previous examples to remove the pyridine sulphate and finally dried. It may be neutralized to form the salt of the ester by a suitable alkaline agent such as potassium hydroxide.

In the above procedures, it will be understood that I may employ other basic materials in place of pyridine. Dimethyl aniline, quinoline, or quinaldine, for example, may be used. The acylation may be carried out also in a different medium such as an aqueous medium using a basic material such as calcium hydroxide to neutralize the hydrochloric acid formed during the course of the reaction. The products may be purified, if desired, by recrystallization from solvents wherever pure compounds are desired. For technical purposes, however, impurities may be allowed to remain.

While the method described above is a satisfactory and a general procedure for the preparation of the compounds of my invention, there are other methods of preparation well suited for the purpose and in specific instances to be preferred to the general method. For an example, the fatty acid esters of glyceric acid may be conveniently prepared by the oxidation of the corresponding monoglycerides:

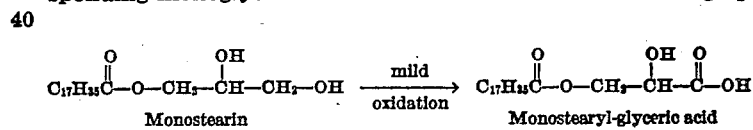
Monostearin → (mild oxidation) → Monostearyl-glyceric acid

Fatty acid esters of polyglycerols may likewise be oxidized to give esters with lipophile groups and with at least one unesterified hydroxy and at least one unesterified carboxyl group.

The compounds of my invention may be considered as having at least two types of groups, namely a lipophile group and a hydrophile group. It is assumed that they function as interface modifiers due to the presence of these two groups which cause the molecule as a whole to orientate itself at the water-oil interface. The lipophile group, preferably a fatty acid as defined hereinabove, may be any group having an affinity for fats and oils. The hydrophile function is exercised primarily by unesterified hydroxy and carboxyl groups in the residue of the hydroxy carboxylic acid. The carboxyl group may be neutralized by cations such as ammonium, the alkalis, the alkaline earths, amines, and other basic materials.

Examples of hydroxy carboxylic acids employed in the formation of the esters of my invention are as follows: mucic acid, tartaric acid, saccharic acid, gluconic acid, glucuronic acid, gulonic acid, mannonic acid, trihydroxyglutaric acid, glyceric acid, and the like, as well as of carboxylic oxidation products of polyglycerols containing free hydroxy groups and at least one of the hydroxy groups oxidized to a carboxyl group, which may be represented by the following formulæ:

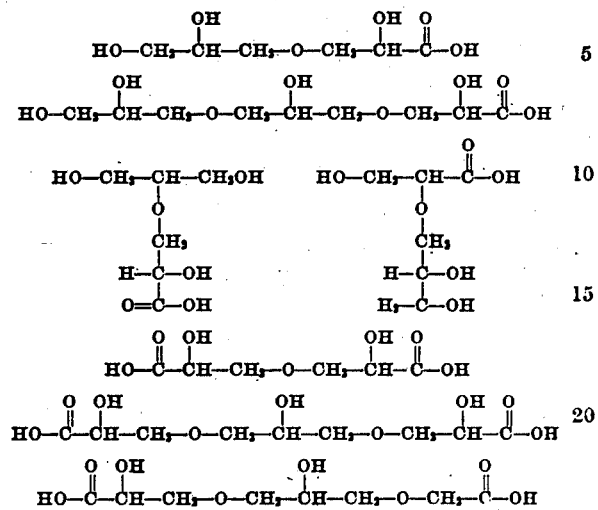

Examples of organic acids with lipophile characteristics employed in the formation of the esters of my invention are caproic acid, capric, caprylic, valeric, butyric, abietic, melissic, hydroxystearic, benzoic, benzoylbenzoic, naphthoic, toluic, palmitic, stearic, lauric, oleic, myristic, ricinoleic, linoleic acid or any fatty acid with at least five carbon atoms, mixtures of the foregoing and mixtures of fatty acids from tallow, lard, cottonseed oil, corn oil, castor oil, neat's-foot oil, hydrogenated oils, spermaceti and beeswax.

The compounds of my invention represent a very large number of substances and it is believed that the class is sufficiently defined without referring specifically to any very large number of members of the class. By way of example, however, I wish to cite the following compounds as coming within the class of my invention: mucic acid palmitate, mucic acid stearate, mucic acid laurate, tartaric acid palmitate, gluconic acid melissate, saccharic acid oleate, glucuronic acid melissate, gluconic acid ricinoleate, glyceric acid monopalmitate, gluconic acid dilaurate (ammonium salt), and substances such as:

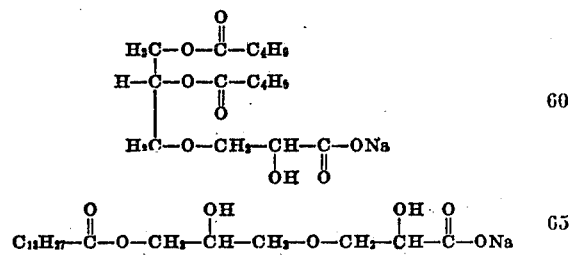

The compounds referred to above are, of course, esters of hydroxycarboxylic acids having at least one unesterified hydroxy group, and may be prepared by the methods described hereinabove for the preparation of mucic acid palmitate, tartaric acid stearate and gluconic acid stearate.

The substances of my invention are for the most part colloidal in character and rather freely dispersible in aqueous media. Those having eight carbon atoms or less in the lipophile group are for the most part soluble in aqueous media. They have the properties of interface modifiers referred to in a preliminary paragraph, and are of great value in certain industries where the reduction or modification of surface tension is necessary in order to promote contact between an aqueous medium and another substance. The dyeing of fabrics, scouring of wool, and stripping of colors from fabrics, treating of leather, floating ores, are examples of connections in which the materials of my invention may be employed. They are used in a treating bath having an aqueous constituent, with addition agents either dispersed or dissolved in the aqueous medium. My substances assist in wetting of the fabrics and aid in the penetrating of the active reagent, whether dye, alkali, mordant, color discharging agent, or any other active reagent is present. They also assist in introducing oils such as sulphonated oils in leather. They may also be used as modifiers of the interfaces of finely divided ores and aqueous media to facilitate separation. My invention, therefore, is directed not only to the new class of substances in themselves, but to a treating bath in which these substances are dissolved or dispersed, to aid the surface action of other reagents present in the bath.

I have shown hereinabove specific examples for the manufacture of fatty acid esters of hydroxy carboxylic acids, such as, for example, gluconic acid stearate, tartaric acid stearate, mucic acid palmitate, and their salts. By similar methods I prepare the fatty acid esters of the hydroxy carboxylic acids, using other fatty acids, such as, for example, the mixed fatty acids obtained from lard or the fatty acids obtained from completely hydrogenated or partially hydrogenated cottonseed oil or corn oil, or the mixed fatty acids of fish oils such as cod oil. For this purpose I dissolve or suspend, in a non-aqueous alkaline medium, such as pyridine, quinoline, quinaldine and similar bases, the water soluble hydroxy carboxylic acid. The amount of base used is in excess of that required to form the salt of the carboxylic acid, as that excess is necessary to react with the hydrochloric acid liberated in the reaction when, subsequently, the acid chloride of the fatty acids is added gradually. It is also desirable to cool the reaction mixture so as to prevent too violent reaction.

The excess pyridine is subsequently washed out, preferably with brine solution, and then sodium hydroxide or a similar alkaline metal base may be added to produce the sodium or other desired salt of the carboxylic acid ester of the fatty acid. The esterification may also take place in the presence of an aqueous alkaline solution; thus the fatty acid chloride is added to the hydroxy carboxylic acid dissolved in an excess of calcium hydroxide.

The esterification of the fatty acids such as the mixed fatty acids of lard or corn oil or similar fatty acids with the hydroxy carboxylic acid may also take place in the presence of an excess of sulphuric acid or fuming sulphuric acid, that is, sulphuric acid containing free sulphur trioxide as a condensing agent. In case the fatty acids contain double bonds, a portion of the sulphuric acid will also react to sulphate the same and the resulting product will be further modified with respect to its interface modifying properties in that the free unesterified carboxylic group which is the residue from the hydroxy carboxylic acids will impart to the resulting reaction product additional hydrophilic properties. It is preferable to conduct the reaction at room temperature or lower temperatures. Then the excess of sulphuric acid is washed out by salting the product out with brine and purifying by the usual methods and neutralizing if desired.

In the case where the fatty acids used are not liquid at ordinary temperatures, such as, for example, stearic acid, the reaction may be conducted by first melting the fatty acid and bringing it in intimate contact with the sulphuric acid and hydroxy carboxylic acid.

As a specific example of the above process, I introduce 42 parts of mucic acid in 13 parts of concentrated sulphuric acid, heat it to about 60° C., and then melt into it 56 parts of stearic acid, stir the mixture and allow it to stand for three hours. A homogeneous mass is obtained. The product is then heated sufficiently to make it flow and is dispersed in 300 parts of water with continuous stirring and agitation, so as to disperse and hydrate the reaction mixture. When the product is sufficiently hydrated, salt is added. Care is taken to break up all lumps. The water dispersion may be slightly warmed in order to facilitate dispersion. The brine solution is separated and the product washed several times with 10% brine solution, until practically all the free sulphuric acid is removed. The product may be neutralized with an alkaline metal hydroxide to produce the sodium or ammonium salts.

I can also use as my starting material a fatty acid ester of a polyhydroxy substance such as fatty acid esters of glycerine or fatty acid esters of polyglycerols, and oxidize one of the free hydroxy groups with a mild oxidizing agent to a carboxyl radicle.

Beside carboxylic acids containing more than one hydroxy group, I can also use malic acid, citric acid, tartronic and similar monohydroxy carboxylic acids, and react the same with a fatty acid chloride in the presence of a base, which will result in a reaction product which will be an ester of a polyhydroxy substance with a free carboxyl group but which will not contain any free hydroxy groups.

For example, 5 parts of citric acid are brought into contact with 60 parts of dry pyridine and 9½ parts of stearyl chloride are added gradually with stirring, while cooling. The mixture is allowed to stand over night to react and is then poured in a 5% sulphuric acid solution containing some ice. The ester is separated out and washed several times with brine water to remove the pyridine sulphate. It may be further neutralized if desired.

Another example: two parts of malic acid are brought in contact with 50 parts of pyridine and 4 parts of stearyl chloride are added gradually, while stirring and cooling. The mixture is allowed to stand for several hours to react and is then poured into a 5% iced sulphuric acid solution. The ester is separated out and purified by the processes given above.

To prepare the palmitic acid ester, I take 4 parts of mucic acid and bring it in contact with 55 parts of pyridine and add to it gradually 6 parts of palmityl chloride, with stirring and cooling. The mixture is allowed to react over night and the mass is then poured into about a 5% iced sulphuric acid solution. The mucic acid palmitate is separated and purified in the manner outlined above, or by any other convenient method.

The salts of the above esters may be made, if desired, by adding sodium or potassium carbonate or ammonium hydroxide to form the alkaline salts of the carboxylic acid esters of the respective fatty acids.

I do not limit this invention to a specific method of preparation, but I do claim the new chemical substances resulting from the above mentioned chemical reactions, which are new and novel and have various important functions in the arts, as shown above, irrespective of the methods by which they are prepared.

What I claim as new and desire to protect by Letters Patent of the United States is:

1. A non-resinous, hydrophilic ester of an aliphatic lipophile carboxylic acid, with at least five carbon atoms, said acid being free of aromatic substituents and an aliphatic hydroxycarboxylic acid, said ester containing at least one unesterified hydroxy group and at least one unesterified carboxyl group in the hydroxy carboxylic acid radical.

2. A non-resinous, hydrophilic ester of an aliphatic lipophile carboxylic acid, with at least five carbon atoms, said acid being free of aromatic substituents and an aliphatic hydroxycarboxylic acid, said ester containing at least one unesterified hydroxy group and at least one unesterified carboxyl group in the hydroxy carboxylic acid radical, the hydrogen of said unesterified carboxyl group being replaced by another cation.

3. A non-resinous, hydrophilic ester of an aliphatic lipophile carboxylic acid, with at least eight carbon atoms, said acid being free of aromatic substituents and an aliphatic hydroxycarboxylic acid, said ester containing at least one unesterified hydroxy group and at least one unesterified carboxyl group in the hydroxy carboxylic acid radical.

4. An ester having a lipohile radical and a hydrophile radical, the hydrophile radical being the radical of an acid of a class consisting of tri-hydroxyglutaric, glyceric, mucic, tartaric, citric, saccharic, gluconic, malic, glucuronic and hydroxycarboxylic oxidation products of polyglycerols, said ester containing at least one unesterified carboxyl group in the hydrophile radical, and the lipophile radical being the radical of an aliphatic lipophile carboxylic acid with at least five carbon atoms, said last mentioned radical being free of aromatic substituents.

5. An ester having a lipophile radical and a hydrophile radical, the hydrophile radical being the radical of an acid of a class consisting of tri-hydroxyglutaric, mucic, glyceric, saccharic, gluconic, tartaric, citric, malic, glucuronic and hydroxycarboxylic oxidation products of polyglycerols, said ester having at least one unesterified carboxyl group in the hydrophile radical, and the lipophile radical including the radical of a lipophile carboxylic acid of a class consisting of caproic, capric, caprylic, valeric, abietic, melissic, hydroxystearic, benzoic, benzoylbenzoic, naphthoic, toluic, palmitic, stearic, lauric, oleic, myristic, ricinoleic, linoleic acid.

6. A non-resinous, hydrophilic ester of a lipophile carboxylic acid, with at least twelve carbon atoms, and an aliphatic hydroxycarboxylic acid, said ester containing at least one unesterified hydroxy group and at least one unesterified carboxyl group in the hydroxy carboxylic acid radical.

7. An ester of a hydroxycarboxylic acid and a fatty acid of a class of substances consisting of fatty acids derived from castor oil, lard, cotton seed oil, sesame oil, tallow, corn oil, neat's foot oil, hydrogenated fatty oils and beeswax, said ester having at least one unesterified OH group and at least one unesterified carboxyl group in said hydroxycarboxylic acid radicle.

8. An ester of lard fatty acids and a hydroxycarboxylic acid with at least one unesterified hydroxy- group and at least one unesterified carboxylic group in the hydroxycarboxylic acid radicle.

9. An ester of castor oil fatty acids and a water soluble hydroxycarboxylic acid with at least one unesterified hydroxy- group and at least one unesterified carboxylic group in the hydroxycarboxylic acid radicle.

10. Mucic acid palmitate having an ester linkage and with at least one unesterified hydroxy- group and one unesterified carboxyl group in the mucic acid radicle.

11. Tartaric acid stearate ester having at least one unesterified carboxyl group in the tartaric acid radicle.

12. An ester of glyceric acid and a fatty acid of a class of substances consisting of fatty acids derived from castor oil, lard, tallow, sesame oil, cotton seed oil, corn oil, neat's foot oil, hydrogenated fatty oils, beeswax,—said esters having one unesterified hydroxy- group and one unesterified carboxylic group in the glyceric acid radicle.

13. A reaction product obtained by reacting a fatty acid chloride containing at least twelve carbon atoms with a water-soluble hydroxy carboxylic acid in the presence of an alkaline medium, said reaction product being separated from the alkaline medium.

14. A reaction product obtained by reacting an aliphatic fatty acid chloride of high molecular weight with a water soluble hydroxy carboxylic acid containing more than one OH group in contact with an alkaline medium, said reaction product being separated from the alkaline medium and containing at least one free OH group and at least one unesterified carboxylic group, said aliphatic fatty acid chloride being free of aromatic substituents.

15. A reaction product obtained by reacting a fatty acyl chloride containing at least 6 carbon atoms with a water soluble hydroxycarboxylic acid of the class consisting of malic, citric, tartaric, mucic, saccharic, gluconic, glucuronic, gulonic, mannonic, trihydroxyglutaric, glyceric, and hydroxycarboxylic oxidation products of polyglycerols, in the presence of an alkaline medium, said reaction product separated from the alkaline medium and containing at least one unesterified carboxyl group in the hydroxycarboxylic acid radical.

16. A reaction product obtained by reacting a fatty acyl chloride containing at least 12 carbon atoms with a water soluble hydroxycarboxylic acid of a class of substances consisting of malic, citric, tartaric, mucic, saccharic, gluconic, glucuronic, gulonic, mannonic, trihydroxyglutaric, glyceric and hydroxycarboxylic oxidation products of polyglycerols, in the presence of an aqueous alkaline medium, said reaction product separated from the alkaline medium and containing at least one unesterified carboxyl group in the hydroxycarboxylic acid radical.

17. A hydrophillic ester resulting from the esterification of an aliphatic water soluble hydroxycarboxylic acid with an aliphatic lipophile carboxylic acid in the presence of sulphuric acid as a condensing agent, said esters separated from the sulphuric acid by salting out of a dispersion in water and comprising at least one unesterified hydroxy group and at least one unesterified carboxyl group in the hydroxycarboxylic acid radical, said lipophile carboxylic acid being free of aromatic substituents.

18. A reaction product obtained by reacting a fatty acyl halide containing at least 16 carbon atoms with a water soluble hydroxycarboxylic acid of the class consisting of malic, citric, tartaric, mucic, saccharic, gluconic, glucuronic, gulonic, mannonic, trihydroxyglutaric, glyceric and hydroxycarboxylic oxidation products of polyglycerols, in the presence of an alkaline medium, said reaction product separated from the alkaline medium and containing at least one unesterified carboxyl group in the hydroxycarboxylic acid radical.

19. A reaction product obtained by reacting a fatty acyl halide of high molecular weight with a water soluble hydroxycarboxylic acid of a class of substances consisting of malic, citric, tartaric, mucic, saccharic, gluconic, glucuronic, gulonic, mannonic, trihydroxyglutaric, glyceric and hydroxycarboxylic oxidation products of polyglycerols, in the presence of an aqueous medium, said reaction product separated from the alkaline medium and containing at least one unesterified carboxyl group in the hydroxycarboxylic acid radical.

20. A non-resinous ester of an aliphatic hydroxycarboxylic acid having more than two esterifiable hydroxy- groups and a lipophile carboxylic acid with at least 5 carbon atoms, said ester having at least one unesterified hydroxy- group and one unesterified carboxylic group in said hydroxycarboxylic acid radicle.

BENJAMIN R. HARRIS.